United States Patent
Takayanagi

(10) Patent No.: US 6,289,438 B1
(45) Date of Patent: Sep. 11, 2001

(54) MICROPROCESSOR CACHE REDUNDANCY SCHEME USING STORE BUFFER

(75) Inventor: Toshinari Takayanagi, Cupertino, CA (US)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/127,119

(22) Filed: Jul. 29, 1998

(51) Int. Cl.⁷ ........................................................ G06F 9/30
(52) U.S. Cl. ........................... 712/218; 711/118; 711/135; 711/141
(58) Field of Search .......................... 712/1, 218; 711/118, 711/135, 128, 141

(56) References Cited

U.S. PATENT DOCUMENTS

| | | |
|---|---|---|
| 5,070,502 | 12/1991 | Supnik . |
| 5,270,975 | * 12/1993 | McAdams ............................ 365/200 |
| 5,537,665 | 7/1996 | Patel et al. . |
| 5,551,004 | 8/1996 | McClure . |
| 5,648,934 | * 7/1997 | O'Toole ................................ 365/200 |
| 5,666,482 | 9/1997 | McClure . |
| 5,708,613 | 1/1998 | Creed et al. . |
| 5,708,789 | 1/1998 | McClure . |
| 5,732,207 | 3/1998 | Allen et al. . |

* cited by examiner

Primary Examiner—Richard Hjerpe
Assistant Examiner—Mackly Monestime
(74) Attorney, Agent, or Firm—Gary Cary Ware & Freidenrich LLP

(57) ABSTRACT

A method and apparatus for bypassing defective cache memory locations on-board a microprocessor integrated circuit chip, which includes a processor, a cache memory, a store buffer, a tag RAM, and a comparator. The cache memory has a plurality of valid cache memory locations and at least one defective cache memory location. The store buffer has buffer entries and redundancy entries for storing data sent by the processor for storage in the cache memory. The tag RAM has buffer tag entries for storing addresses of data stored in the buffer entries and redundancy tag entries that store addresses of defective cache memory locations in the cache memory. The comparator compares addresses of data sent by the processor for cache memory storage with addresses stored in the redundancy tag entries. For each data sent by the processor for cache memory storage, if the data address matches an address stored in one of the redundancy tag entries, then the store buffer stores that data in the corresponding redundancy entry, otherwise the store buffer stores that data in one of the buffer entries. The store buffer sends data stored in the buffer entries to the cache memory for storage in the valid cache memory locations, but the data stored in the redundancy entries (corresponding to defective cache memory locations) is retained in the store buffer. Therefore, when the processor wants to retrieve data with an address corresponding to the defective cache memory location, the requested data is supplied by the corresponding redundancy entry of the store buffer.

20 Claims, 4 Drawing Sheets

MICROPROCESSOR CACHE REDUNDANCY SCHEME USING STORE BUFFER

FIELD OF THE INVENTION

The present invention relates to cache memory for computer systems, and more particularly to cache memory on-board a microprocessor integrated circuit chip where a store buffer is used to bypass defective cache memory data locations.

BACKGROUND OF THE INVENTION

The main memory (especially DRAM) of a computer system is generally separate from the microprocessor integrated circuit chip and organized with memory cells disposed in an array structure for quick access. It is extremely difficult to mass produce memory chips that do not contain at least some defective memory cells thereon. Scrapping memory chips with defective memory cells can be expensive, and therefore methods of bypassing those defects have been developed.

One popular technique for bypassing memory chip defects is adding redundant rows and/or columns, along with a reallocation circuit, to the memory chip. After manufacture, each memory cell, row and/or column on the chip is tested for defects. If a defect is found, the reallocation circuit is used to substitute one of the redundant rows/columns for the row/column containing the defect. This substitution is performed by reallocating addresses of defective memory rows/columns with addresses of redundant memory rows/columns. This redundancy technique has the advantage of greatly enhancing chip yield which lowers chip cost because chips with relatively few defects are usable and need not be scrapped. However, the drawback to this redundancy technique is that the added reallocation circuit and redundant memory rows/columns take up valuable space on the memory chip.

In addition to system main memory, cache memory (especially SRAM) is typically used in computer systems for increasing memory access speeds. Cache memory is used to temporarily retain data that the processor will likely require and access in executing current operations, especially data that is repeatedly and/or sequentially accessed. There is a substantial increase in the execution speed of individual processes, and therefore of the overall computer system, by providing cache memory which can be accessed much faster than the slower system main memory. This speed improvement is provided by SRAM, which is faster than DRAM, and by the cache being closer to the processor. Cache memory is typically accessed by using memory addresses of data requested by the processor which correspond to cache contents. If the requested data is contained in the cache memory, that data is supplied from the cache memory to the processor. If the requested data is not contained in the cache memory, then that data is supplied to the processor from the system main memory.

Typically, cache memory resides between the processor and the system main memory. More recently, cache memory (such as SRAM) has been formed on-board the microprocessor chip itself in order to increase the speed of cache memory access. One such microprocessor chip 1 is partially illustrated in FIG. 1, and includes a processor 2, a data cache memory 3, a decoder 4, a store buffer 5 and a comparator 6.

The processor 2 sends fetch instructions to retrieve data from the cache memory 3, as well as authorizing data to be written to cache memory 3. Reading data from, and writing data back to, cache memory 3 takes several steps. For example, in a 6 stage pipeline microprocessor cache, there are six steps for cache memory access and rewrite: 1) the fetch instruction step where the processor 2 requests data, 2) a decode step where the decoder of the processor decodes the fetched instruction, 3) an address generation step where an address of the requested data is generated, 4) a memory access step where the requested data is read from cache memory 3 using cache address decoder 4 and is sent to the processor 2, 5) an execution step where the processor 2 executes an operation using the requested data, and 6) a write step where data generated by the execution step of the processor 2 is written back to the cache memory 3.

For maximum processor speed performance, it is important that the data retrieval operations (the fetch, decode, address generation and memory access steps) be performed as quickly as possible. If the processor is forced to wait to retrieve data from cache memory, e.g. because other data is currently being written to cache memory 3, then the processor 2 is in a wait state which decreases processor performance. In order to prevent processor 2 from being in a wait state, store buffer 5 is provided to temporarily store data to be written to cache memory 3. The data stored in store buffer 5 are written to cache memory 3 only when data retrieval from cache memory 3 is not taking place. By giving cache memory 3 data writing a low priority relative to cache memory 3 data retrieval, performance of the processor is increased.

In the example illustrated in FIG. 1, a multi-entry, FIFO (first in, first out) store buffer 5 is used. Each buffer entry S1, S2, S3 and S4 stores data to be written to cache memory 3, and has a corresponding store buffer tag entry 7 with the address of the stored data. Data to be written to cache memory 3 is initially received and stored in the S1 buffer entry with the corresponding address stored in the first entry of the store buffer tag 7. When the next data is sent for cache memory storage, it is received and stored in the S1 buffer entry, and the former contents of the S1 buffer entry are written into the S2 buffer entry, and so on. When cache memory access is available (e.g. when the processor is not retrieving data from cache memory), data stored in store buffer 5 is written to cache memory on a first in, first out basis (i.e. highest S level buffer entry first). Therefore, even though data may be continually sent to cache memory for storage therein, writing such data to cache memory does not interfere with or delay data retrieval from cache memory by the processor, and processor waiting is avoided.

Comparator 6 gives microprocessor 1 both bypass and merge capabilities by comparing addresses in tag entries 7 with addresses of data being fetched by, and sent from, processor 2. More specifically, the bypass function allows access to data stored in the store buffer 5 that has not yet been written to the cache memory. If the address of the data being fetched by processor 2 matches the address of data stored in the store buffer 5 (as determined by comparator 6), then that data is read out directly from the appropriate entry of the store buffer 5 to the processor 2. Thus, the processor 2 is not forced to wait until the requested data is written to cache memory 3 from the store buffer 5 before retrieving that data. The merge function allows the rewriting of data in the store buffer 5 before it has been written to cache memory 3. If the address of new data sent from processor 2 for cache memory storage matches the address of data still stored in the store buffer 5, then instead of creating another buffer entry, the buffer entry containing the old data is simply rewritten with the new data.

The problem with the microprocessor chip 1 described above is that it does not provide a means for bypassing defective memory rows and/or columns in the cache memory 3. If cache memory defects exist, the microprocessor has to be scrapped in its entirety, which is expensive given the complexity and cost of microprocessor chips. There is a need for a microprocessor that can bypass defects in the cache memory area thereof.

One solution is to re-direct data requests for defective cache memory portions to the computer's main memory, as is disclosed in U.S. Pat. Nos. 5,551,004 and 5,708,789. However, processor speed and performance suffers because of the relatively long time it takes to access data from system main memory as compared to cache memory, especially if there are many defective cache memory portions.

SUMMARY OF THE INVENTION

The present invention solves the aforementioned problems by using redundancy entries of a store buffer to bypass defective portions of the cache memory.

According to the present invention, a microprocessor integrated circuit chip comprises a processor, a cache memory, a store buffer, a tag RAM, and a comparator. The cache memory has a plurality of valid cache memory locations and at least one defective cache memory location. The store buffer has buffer entries and redundancy entries for storing data sent by the processor for storage in the cache memory. The tag RAM has buffer tag entries for storing addresses of data stored in the buffer entries and redundancy tag entries for storing addresses of defective cache memory locations in the cache memory. The comparator compares addresses of data sent by the processor for cache memory storage with addresses stored in the redundancy tag entries. For each data sent by the processor for cache memory storage, if the data address matches an address stored in one of the redundancy tag entries, then the store buffer stores that data in the corresponding redundancy entry, otherwise the store buffer stores that data in one of the buffer entries. The store buffer sends data stored in the buffer entries to the cache memory for storage in the valid cache memory locations.

In another aspect of the present invention, a method of bypassing defective cache memory locations in a cache memory area of a microprocessor integrated circuit chip, that also includes a processor, a store buffer with buffer entries and redundancy entries for storing data, and a tag RAM with buffer tag entries and redundancy tag entries for storing data addresses, where the cache memory has valid and defective cache memory locations, comprising the following steps. Non-volatile addresses of defective cache memory locations are stored in the redundancy tag entries. Addresses of data sent by the processor for cache memory storage are compared with addresses stored in the redundancy tag entries. Data sent by the processor for cache memory storage are stored in the store buffer, wherein the data having addresses matching addresses stored in the redundancy tag entries are stored in the redundancy entries, and the data having addresses not matching addresses stored in the redundancy tag entries are stored in the buffer entries. The data stored in the buffer entries is written to the valid cache memory locations.

In yet another aspect of the present invention, a microprocessor integrated circuit chip comprises processor means, cache memory means, store buffer means, tag RAM means, comparator means and storage means. The processor means writes data to cache memory storage and retrieves data from cache memory storage. The cache memory means stores data in cache memory locations. The store buffer means includes buffer entries for receiving and storing data sent by the processor for storage in the cache memory, sending means for sending data stored in the buffer entries to the cache memory for storage in the valid cache memory locations, and redundancy entries for receiving and storing data sent by the processor for storage in the cache memory. The data stored in the redundancy entries is not sent to the cache memory means for storage therein. The tag RAM means stores data addresses, and includes buffer tag entries for storing addresses of data stored in the buffer entries and redundancy tag entries for storing addresses of defective cache memory locations in the cache memory. The comparator means compares addresses of data sent by the processor for cache memory storage with addresses stored in the redundancy tag entries. The storing means stores each data sent by the processor for cache memory storage in the store buffer means for storage either in one of the redundancy tag entries or in one of the buffer entries.

Other objects and features of the present invention will become apparent by a review of the specification, claims and appended figures.

DETAILED DESCRIPTION OF THE PREFERRED EMBODIMENTS

The present invention is a microprocessor 22 with an on-board cache memory 24 that uses redundancy buffer entries S5 in a store buffer 28 for bypassing cache memory defects without having to access the system's slower main memory.

Figure 1:
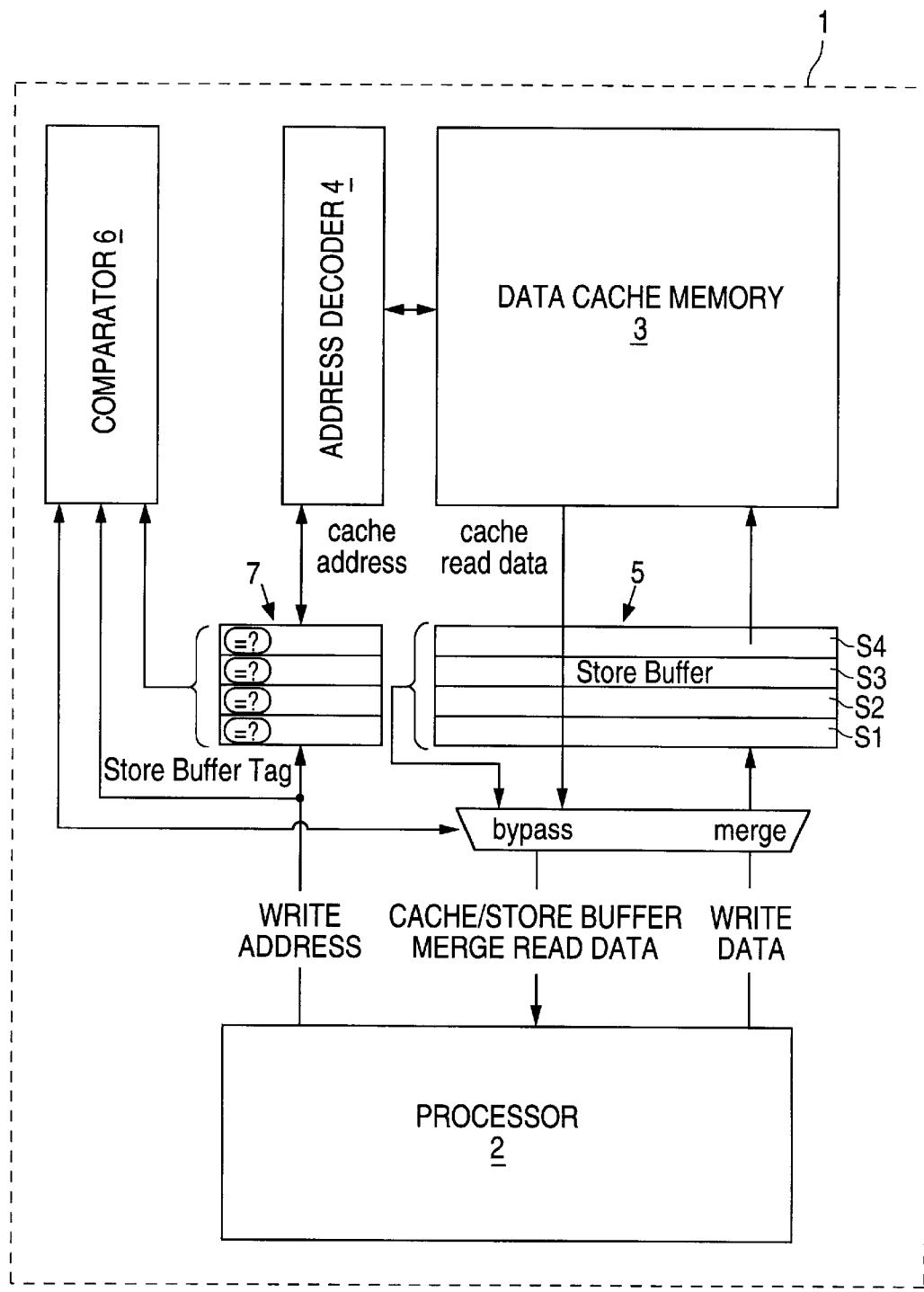
FIG. 1 is a block diagram of a conventional microprocessor.
Figure 2:
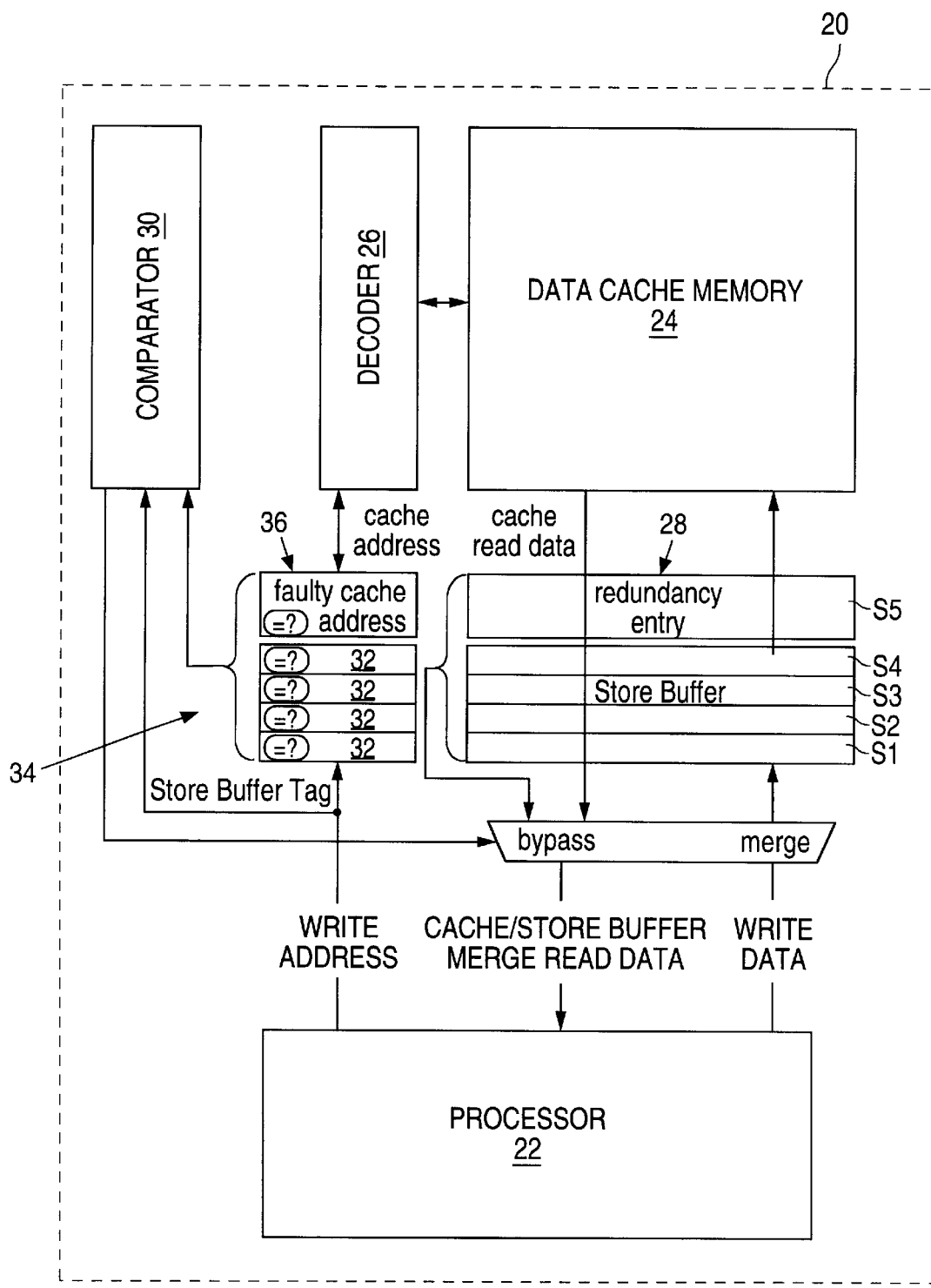
FIG. 2 is a block diagram of a microprocessor of the present invention.

A portion of the microprocessor chip 20 of the present invention is illustrated in FIG. 2, and includes a processor 22, a data cache memory 24, a decoder 26, a store buffer 28 and a comparator 30.

The processor 22 sends fetch instructions to retrieve data from, as well as authorizing data to be written to, cache memory 24. The present invention is described with respect to, but not limited to, a six stage microprocessor 22 which takes six steps to read data from cache memory 24, operate on that data, and write data to cache memory 24. The processor 22 can operate on instructions in pipeline or parallel fashion. Furthermore, the processor 22 can be a RISC or CISC type of processor. First, an instruction is fetched from the cache memory 24 or any other memory storage area. Second, the fetched instruction is decoded by the processor 22 and the type of operation to be performed is determined. Third, the address location for the data to be used in the operation is then determined. Fourth, the requested data is read from cache memory 24 and sent to processor 22. Fifth, processor 22 executes an operation using the requested data. Sixth, data generated by the execution step of the processor 22 is written back to the cache memory 24.

To maximize processor speed performance and minimize any processor wait state, data retrieval from cache memory (the fetch, decode, address generation and cache memory access steps) has priority over writing data to cache memory 24. This priority is accomplished by providing store buffer 28, which receives and temporarily stores data that is to be written to cache memory. The data stored in store buffer 28 is written from store buffer 28 to cache memory 24 only when access thereto is available (i.e. when data retrieval from cache memory is not taking place).

In the microprocessor 20 illustrated in FIG. 2, a multi-entry FIlO (first in, first out) store buffer 28 is used. As an example, there are four buffer entries (S1, S2, S3 and S4) that temporarily store data to be written to cache memory 24. Each buffer entry S1–S4 has a corresponding store buffer tag entry 32 in a tag RAM 34 for storing the address of data stored in that buffer entry. Data to be written to cache memory is initially received and stored in the S1 buffer entry. When the next data is sent for cache memory storage, it is received and stored in the S1 buffer entry, and the former contents of the S1 buffer entry are written into the S2 buffer entry, and so on. When cache memory access is available (i.e. when the processor is not retrieving data from cache memory), data stored in store buffer 28 is written to cache memory on a first in, first out basis (i.e. highest S level entry first).

Comparator 6 compares addresses stored in tag RAM 34 with addresses of data being fetched by, and sent from, processor 22. If the address of the data being fetched by processor 22 matches the address of data stored in the store buffer 28, then that data is read out directly from the store buffer 28 to the processor 22. With this bypass feature, the processor is not forced to wait until the requested data is written to cache memory before retrieving that data. If the address of new data sent by processor 22 for cache memory storage matches the address of data still stored in the store buffer 28, then instead of creating another buffer entry, the buffer entry containing the old data is simply rewritten with the new data. This merge feature prevents multiple data with the same address from taking up more that one buffer entry.

According to the present invention, store buffer 28 additionally includes one or more redundancy buffer entries S5, each with a corresponding redundancy tag entry 36. The redundancy entries S5 are used to store data that would otherwise be written to defective portions of the cache memory 24. After manufacture, the cache memory 24 is tested to detect defective portions (e.g. a single memory bit, a word or a byte of memory, or even a row or column of memory cells) therein. For each defective portion detected, one of the redundancy tag entries 36 is pre-preprogrammed to contain the address of the defective cache memory portion (e.g. by hardwiring the redundancy tag entry 36 to the specific address value, or by blowing a fuse, or by storing data in non-volatile electrically alterable memory). While data stored in entries S1–S4 is written to cache memory 24 as soon as access thereto permits, data stored in the redundancy entries S5 are never written to cache memory 24. Instead, data stored in redundancy entries S5 remains in store buffer 28 until specifically erased or new data is written thereover. Therefore, the only differences between redundancy entries S5 and ordinary buffer entries S1–S4 are that the tag entries 36 of redundancy entries S5 are stored always to specific values (defective cache memory addresses) and data stored in redundancy entries S5 is never retired to cache memory 24.

Redundancy entries S5 of store buffer 28 function as cache redundancy locations for defective portions of cache memory 24, without having to add any additional reallocation circuits or endure access time penalties therefrom. By programming redundancy tag entries 36 with the addresses of defective cache memory portions, store buffer 28 and comparator 30 intercept data addressed to defective portions of cache memory and store this data in redundancy entries S5 for later retrieval as described below.

Figure 3A:
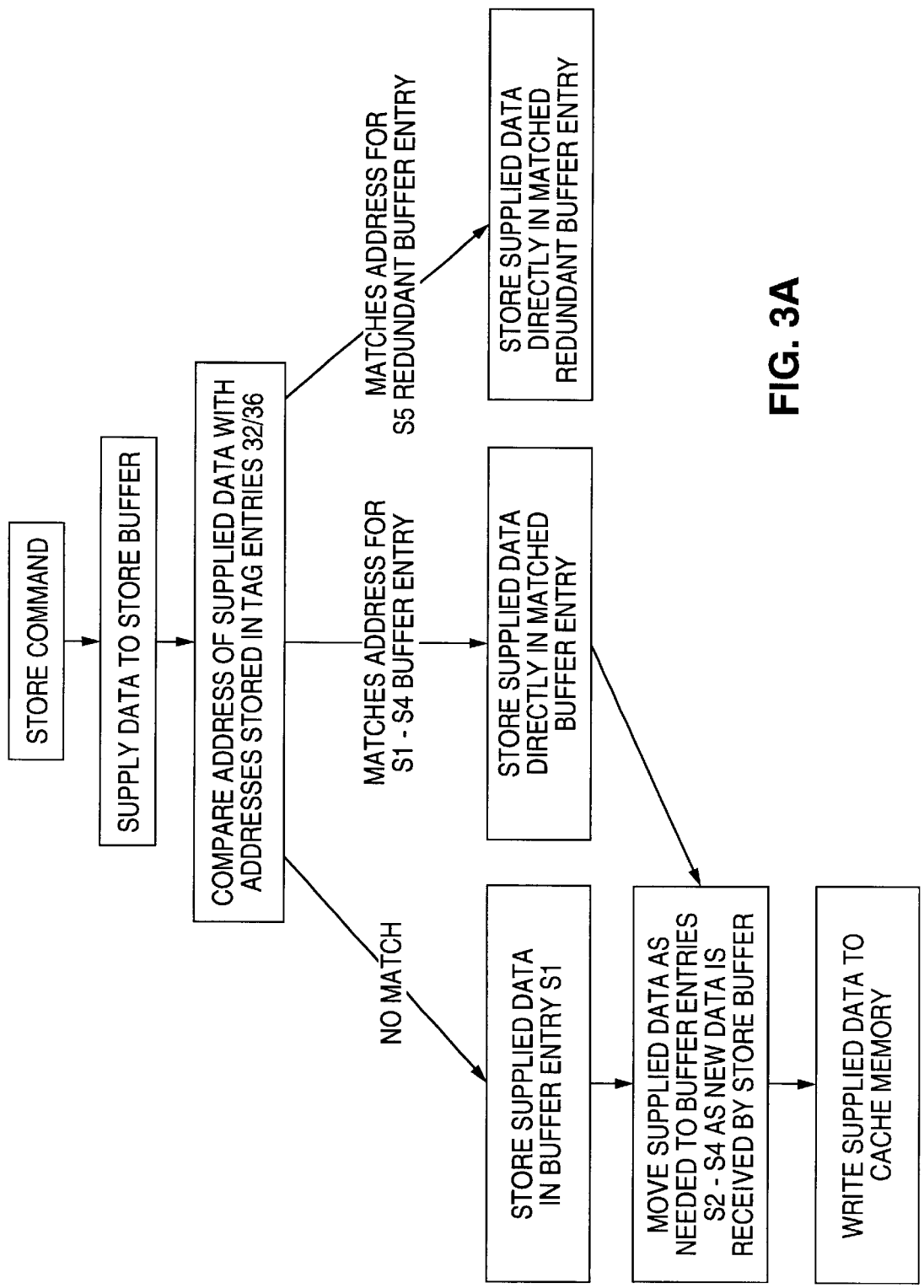
FIG. 3A is a flow chart of steps performed by the microprocessor of the present invention to store data sent from the processor for cache memory storage.

FIG. 3A illustrates the operation of microprocessor 20 when data is supplied from processor 22 for storage in cache memory. After a store command, where data to be written to cache memory is supplied by processor 22, comparator 30 compares the address of the supplied data to addresses stored in tag entries 32/36. If there is no match, the supplied data and its address are stored in buffer entry S1 and its associated buffer tag entry 32. After being moved up to S2, S3 etc. as new data is received by store buffer 28, the supplied data is written to cache memory 24 (e.g. from entry S4) when access to cache memory 24 is available. If the supplied data address matches a buffer tag entry 32 for S1–S4 buffer entries, the supplied data and its address are written directly to that buffer entry and its corresponding tag entry 32, where the supplied data is eventually written to cache memory 24. If the supplied data address matches a redundancy tag entry 36 (corresponding to a defective portion in cache memory 24), then the supplied data is written to that redundancy entry S5. Thus, data to be written to defective portions of cache memory 24 is diverted and stored in redundancy entries S5 of store buffer 28, and therefore data writing to defective portions of cache memory is avoided.

Figure 3B:
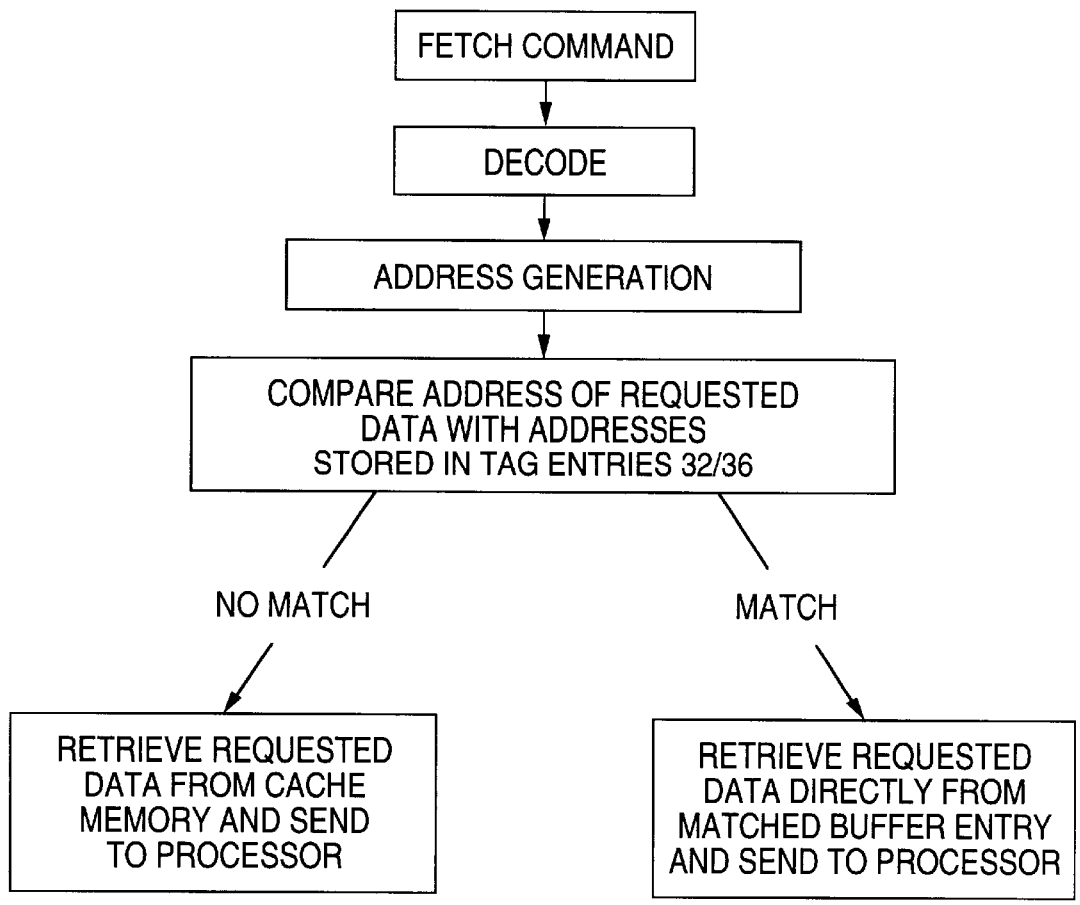
FIG. 3B is a flow chart of steps performed by the microprocessor of the present invention to retrieve data from cache memory.

FIG. 3B illustrates the operation of microprocessor 20 when data is retrieved from cache memory. After a fetch command, the fetch instruction is decoded by the decoder portion of the processor 22 and an address for the requested data is generated by processor 22. Then, comparator 30 compares the requested data address with the addresses stored in tag entries 32/36. If there is no address match, then the requested data is read from cache memory 24 and supplied to processor 22. If there is an address match, then the requested data is read directly from the corresponding buffer entry S1–S4 or redundancy entry S5. Thus, any data to be retrieved from defective portions of cache memory is instead retrieved directly from redundancy entries S5, and therefore data retrieval from defective portions of cache memory 24 is avoided.

While FIG. 2 illustrates a single redundancy entry S5 for simplicity, the preferred embodiment preferably includes a plurality of redundancy entries S5 sufficient in number to meet or exceed the number of defective portions in cache memory 24 that need bypassing. Programming of extra redundancy entries S5 can be done by a conventional poly or metal fuse programming method or can be done by a chip initializing sequence by setting the tag entries electrically.

Bypassing defective cache memory portions using the store buffer 28 is advantageous because minimal hardware need be added and minimal timing penalty need be endured. In a conventional microprocessor, the store buffer 28 and comparator 30 already exist. Therefore, the only hardware addition is redundancy entries S5 and hard-wired tags entries 36, which use a relatively small area on the microprocessor chip compared with traditional memory redundancy schemes. Further, the timing penalty of accessing the redundancy entries S5 is smaller than conventional column redundancy schemes (because multiplexer delay for redundancy data selection is not needed) or conventional row redundancy schemes (because faulty row detection has to be finished before wordline assertion in conventional schemes which slows down the whole process). Further, in the present invention, the wordline-to-data-out speed of store buffer 28 is faster than data cache memory. Lastly the present invention does not slow down store buffer 28 because data addressed to a defective portion of cache memory 24 is written directly to redundancy entries S5, not buffer entry S1.

It is to be understood that the present invention is not limited to the embodiment described above and illustrated herein, but encompasses any and all variations falling within the scope of the appended claims. For example processors that take more or take few steps than six to read, execute on, and write cache data can be used. Further any number of buffer entries and redundancy entries can be used within the scope of the present invention.

What is claimed is:

1. A microprocessor integrated circuit chip, comprising:
   a processor;
   a cache memory having a plurality of valid cache memory locations and at least one defective cache memory location;
   a store buffer having buffer entries and redundancy entries for storing data sent by the processor for storage in the cache memory;
   a tag RAM having buffer tag entries for storing addresses of data stored in the buffer entries and redundancy tag entries for storing addresses of defective cache memory locations in the cache memory; and
   a comparator for comparing addresses of data sent by the processor for cache memory storage with addresses stored in the redundancy tag entries;
       wherein, for each data sent by the processor for cache memory storage, if the data address matches an address stored in one of the redundancy tag entries, then the store buffer stores that data in the corresponding redundancy entry, otherwise the store buffer stores that data in one of the buffer entries; and
       wherein the store buffer sends data stored in the buffer entries to the cache memory for storage in the valid cache memory locations.

2. The microprocessor integrated circuit chip of claim 1, wherein the store buffer does not send data stored in the redundancy entries to the cache memory for storage therein.

3. The microprocessor integrated circuit chip of claim 1, wherein:
   for each data stored in the buffer entries, that data's address is stored in a corresponding buffer tag entry;
   the comparator compares addresses of data sent by the processor for cache memory storage with addresses stored in the buffer tag entries, and
   for each data sent by the processor for cache memory storage, if the data address matches an address stored in one of the buffer tag entries, then the store buffer stores that data in the corresponding buffer entry.

4. The microprocessor integrated circuit chip of claim 1, wherein:
   for each data stored in the buffer entries, that data's address is stored in a corresponding buffer tag entry;
   the comparator compares addresses of data requested by the processor with addresses stored in the buffer tag entries and redundancy tag entries; and
   for each data requested by the processor from cache memory storage, if the data address matches an address stored in one of the redundancy tag entries, then the store buffer supplies the data stored in the corresponding redundancy entry to the processor, and if the data address matches an address stored in one of the buffer tag entries, then the store buffer supplies the data stored in the corresponding buffer entry to the processor.

5. The microprocessor integrated circuit chip of claim 4, wherein for each data requested by the processor from cache memory storage, if the data address fails to match any addresses stored in the redundancy tag entries and the buffer tag entries, then the requested data is read from the cache memory and supplied to the processor.

6. The microprocessor integrated circuit chip of claim 5, wherein data stored in the buffer entries are written to the cache memory only while data is not being read from the cache memory.

7. The microprocessor integrated circuit chip of claim 1, wherein addresses of defective cache memory locations in the cache memory are permanently stored in the redundancy tag entries.

8. The microprocessor integrated circuit chip of claim 7, wherein the redundancy tag entries are hardwired with the address values of the defective cache memory locations.

9. A method of bypassing defective cache memory locations in a cache memory area of a microprocessor integrated circuit chip that also includes a processor, a store buffer with buffer entries and redundancy entries for storing data, and a tag RAM with buffer tag entries and redundancy tag entries for storing data addresses, the cache memory having valid and defective cache memory locations, the method comprising the steps of:
   storing non-volatile addresses of defective cache memory locations in the redundancy tag entries;
   comparing addresses of data sent by the processor for cache memory storage with addresses stored in the redundancy tag entries;
   storing the data sent by the processor for cache memory storage in the store buffer, wherein the data having addresses matching addresses stored in the redundancy tag entries are stored in the redundancy entries, and the data having addresses not matching addresses stored in the redundancy tag entries are stored in the buffer entries; and
   writing the data stored in the buffer entries to the valid cache memory locations.

10. The method of claim 9, further comprising the steps of:
    storing an address for each data stored in the buffer entries in a corresponding buffer tag entry;
    comparing addresses of data sent by the processor for cache memory storage with addresses stored in the buffer tag entries; and
    storing data sent by the processor for cache memory storage in a corresponding buffer entry in the event that data has an address that matches an address stored in one of the buffer tag entries.

11. The method of claim 10, further comprising the steps of:
    comparing addresses of data requested by the processor with addresses stored in the buffer tag entries and redundancy tag entries; and
    for each data requested by the processor from cache memory storage:
       supplying the data stored in one of the redundancy entries to the processor if the requested data address matches an address stored in a corresponding redundancy tag entry, and
       supplying the data stored in one of the buffer entries to the processor if the requested data address matches an address stored in a corresponding buffer tag entry.

12. The method of claim 11, further comprising the step of reading the requested data from the cache memory and supplying the read data to the processor if the address of the requested data fails to match any addresses stored in the redundancy tag entries and the buffer tag entries.

13. The method of claim 12, wherein the writing step is performed only while the reading step of requested data from the cache memory is not being performed.

14. The method of claim 9, wherein the permanently storing step includes hard-wiring the redundancy tag entries with the address values of the defective cache memory locations.

15. A microprocessor integrated circuit chip, comprising:

processor means for writing data to cache memory storage and for retrieving data from cache memory storage;

cache memory means for storing data in cache memory locations;

store buffer means having:

buffer entries for receiving and storing data sent by the processor for storage in the cache memory, means for sending data stored in the buffer entries to the cache memory for storage in the valid cache memory locations, and redundancy entries for receiving and storing data sent by the processor for storage in the cache memory, wherein the data stored in the redundancy entries is not sent to the cache memory means for storage therein;

tag RAM means for storing data addresses, the tag RAM means having buffer tag entries for storing addresses of data stored in the buffer entries and redundancy tag entries for storing addresses of defective cache memory locations in the cache memory; and comparator means for comparing addresses of data sent by the processor for cache memory storage with addresses stored in the redundancy tag entries; and means for storing each data sent by the processor for cache memory storage in the store buffer means for storage either in one of the redundancy tag entries or in one of the buffer entries.

16. The microprocessor integrated circuit chip of claim 15, wherein:

for each data stored in the buffer entries, that data's address is stored in a corresponding buffer tag entry;

the comparator means comprises means for comparing addresses of data sent by the processor for cache memory storage with addresses stored in the buffer tag entries, and the means for storing includes means for storing data sent by the processor for cache memory storage into the buffer entries if the addresses of the data match addresses stored in corresponding buffer tag entries.

17. The microprocessor integrated circuit chip of claim 15, wherein:

for each data stored in the buffer entries, that data's address is stored in a corresponding buffer tag entry;

the comparator means includes means for comparing addresses of data requested by the processor with addresses stored in the buffer tag entries and redundancy tag entries; and the storing means includes retrieval means for retrieving data requested by the processor from cache memory storage and supplying the retrieved data to the processor, wherein if a requested data has an address matching an address stored in one of the redundancy tag entries, then the retrieval means retrieves the requested data from the corresponding redundancy entry, and if a requested data has an address matching an address stored in one of the buffer tag entries, then the retrieval means retrieves the requested data from the corresponding buffer entry.

18. The microprocessor integrated circuit chip of claim 17, wherein for each data requested by the processor from cache memory storage, if the data has an address that fails to match any addresses stored in the redundancy tag entries and the buffer tag entries, then the retrieval means retrieves the requested data from the cache memory.

19. The microprocessor integrated circuit chip of claim 15, wherein the sending means sends data stored in the buffer entries to the cache memory only while the retrieval means is not retrieving data from the cache memory.

20. The microprocessor integrated circuit chip of claim 15, wherein addresses of defective cache memory locations in the cache memory are permanently stored in the redundancy tag entries.

* * * * *